United States Patent
Ku et al.

(10) Patent No.: US 11,019,217 B2
(45) Date of Patent: *May 25, 2021

(54) METHOD AND APPARATUS FOR COMMUNICATIONS BETWEEN CARRIERS

(71) Applicant: AT&T Intellectual Property I, L.P., Atlanta, GA (US)

(72) Inventors: Bernard Ku, Austin, TX (US); Lakshminarashimhan Naidu, Pearland, TX (US); James W. Forsyth, Royal Oak, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 193 days.

This patent is subject to a terminal disclaimer.

(21) Appl. No.: 16/270,638

(22) Filed: Feb. 8, 2019

(65) Prior Publication Data
US 2019/0174004 A1      Jun. 6, 2019

Related U.S. Application Data

(63) Continuation of application No. 15/224,967, filed on Aug. 1, 2016.

(51) Int. Cl.
*H04M 7/00* (2006.01)
*H04L 29/12* (2006.01)

(52) U.S. Cl.
CPC ........ *H04M 7/0063* (2013.01); *H04L 61/157* (2013.01); *H04L 61/1511* (2013.01);
(Continued)

(58) Field of Classification Search
CPC .............. H04M 7/0063; H04M 7/0075; H04L 61/1511; H04L 61/157; H04L 61/304; H04L 61/605
(Continued)

(56) References Cited

U.S. PATENT DOCUMENTS 7,529,231 B2 * 5/2009 Soo ................... H04L 29/06027
370/352
8,077,701 B2   12/2011 Ku et al.
(Continued)

FOREIGN PATENT DOCUMENTS

EP         1988662 A1    11/2008
JP       2015156541       8/2015
(Continued)

OTHER PUBLICATIONS

Cisco, "Cisco Call Session Control Platform", http://www.cisco.com/c/en/us/products/collateral/unified-communications/callsession-control-platform/product_data_sheet0900aecd80396990.html, Jan. 20, 2006, 1-10.
(Continued)

*Primary Examiner* — Chi Tang P Cheng
(74) *Attorney, Agent, or Firm* — Guntin & Gust, PLC; Robert Gingher

(57) ABSTRACT

Aspects of the subject disclosure may include, for example, responsive to determining that a second device is associated with a first carrier network, obtaining a first record associated with a called number of the second device from a first carrier network telephone number mapping equipment server of the first carrier network, and transmitting a first internet protocol address for the second device from the first record to a terminating call session control function server of the first carrier network to initiate the internet protocol call session. Responsive to a second determination that the second device is associated with a second carrier network, obtaining a second record associated with the called number according to a pointer to a second carrier network telephone number mapping equipment server of the second carrier network, and transmitting a second internet protocol address for the second device derived from the second record to a session border controller of the first carrier network to (Continued)

initiate the internet protocol call session. Other embodiments are disclosed.

20 Claims, 8 Drawing Sheets

(52) U.S. Cl.
CPC ........ *H04L 61/304* (2013.01); *H04M 7/0075* (2013.01); *H04L 61/605* (2013.01)

(58) Field of Classification Search
USPC .......................................... 370/352
See application file for complete search history.

(56) References Cited

U.S. PATENT DOCUMENTS

| | | | |
|---|---|---|---|
| 8,218,531 | B2 | 7/2012 | Qiu et al. |
| 8,681,774 | B2 | 3/2014 | Ku et al. |
| 8,861,511 | B2 | 10/2014 | Ku et al. |
| 8,879,442 | B2 | 11/2014 | Ku |
| 9,124,603 | B2 | 9/2015 | Jackson et al. |
| 9,307,090 | B2 | 4/2016 | Verbil et al. |
| 2006/0039397 | A1 | 2/2006 | Hari et al. |
| 2007/0047523 | A1 | 3/2007 | Jiang et al. |
| 2008/0090569 | A1 | 4/2008 | Khan et al. |
| 2010/0158229 | A1* | 6/2010 | Ku ............... H04L 29/1216 379/201.01 |
| 2011/0019661 | A1 | 1/2011 | Ku et al. |
| 2015/0031331 | A1 | 1/2015 | Silver et al. |
| 2015/0248709 | A1 | 9/2015 | Qiu et al. |
| 2015/0264089 | A1 | 9/2015 | Ramanchandran et al. |
| 2018/0034971 | A1 | 2/2018 | Ku |

FOREIGN PATENT DOCUMENTS

| | | |
|---|---|---|
| KR | 20110070401 | 6/2011 |
| KR | 20130045049 A | 3/2013 |

OTHER PUBLICATIONS

Cumming, Jonathan, "Session Border Control in IMS: An Analysis of the Requirements for Session Border Control in IMS Networks", http://mirror.unpad.ac.id/orari/library/library-ref-eng/ref-eng-3/network/mpls/SBCinIMS.pdf, Sep. 2005, 1-29.

Oddy, Sharon et al., "Telcordia Advances IP Calling Services With New VOIP Routing Registry; Breakthrough Expands New Commercial Opportunities for VOIP Carriers", Business Wire a Berkshire Hathaway Company, Sep. 19, 2005, 1-2.

Richenaker, Gary, "Next Generation NP Solutions and ENUM", Neustar https://www.itu.int/ITU-D/treg/Events/Seminars/2011/Moldova/pdf/Session8_NextGeneration_Solutions.pdf Discloses routing solutions for inter-carrier connections, May 2011, 1-37.

Vasudev, "Press Release: Vasudev Global Selects Sansay As Their Session Border Controller Partner", http://vasudevglobal .com/Press release2.html, Apr. 8, 2011, 1-2.

* cited by examiner

300

800

METHOD AND APPARATUS FOR COMMUNICATIONS BETWEEN CARRIERS

CROSS-REFERENCE TO RELATED APPLICATIONS

This application is a Continuation of U.S. patent application Ser. No. 15/224,967 filed on Aug. 1, 2016. All sections of the aforementioned application are incorporated herein by reference in their entirety.

FIELD OF THE DISCLOSURE

The subject disclosure relates to a method and apparatus for communications between carriers.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
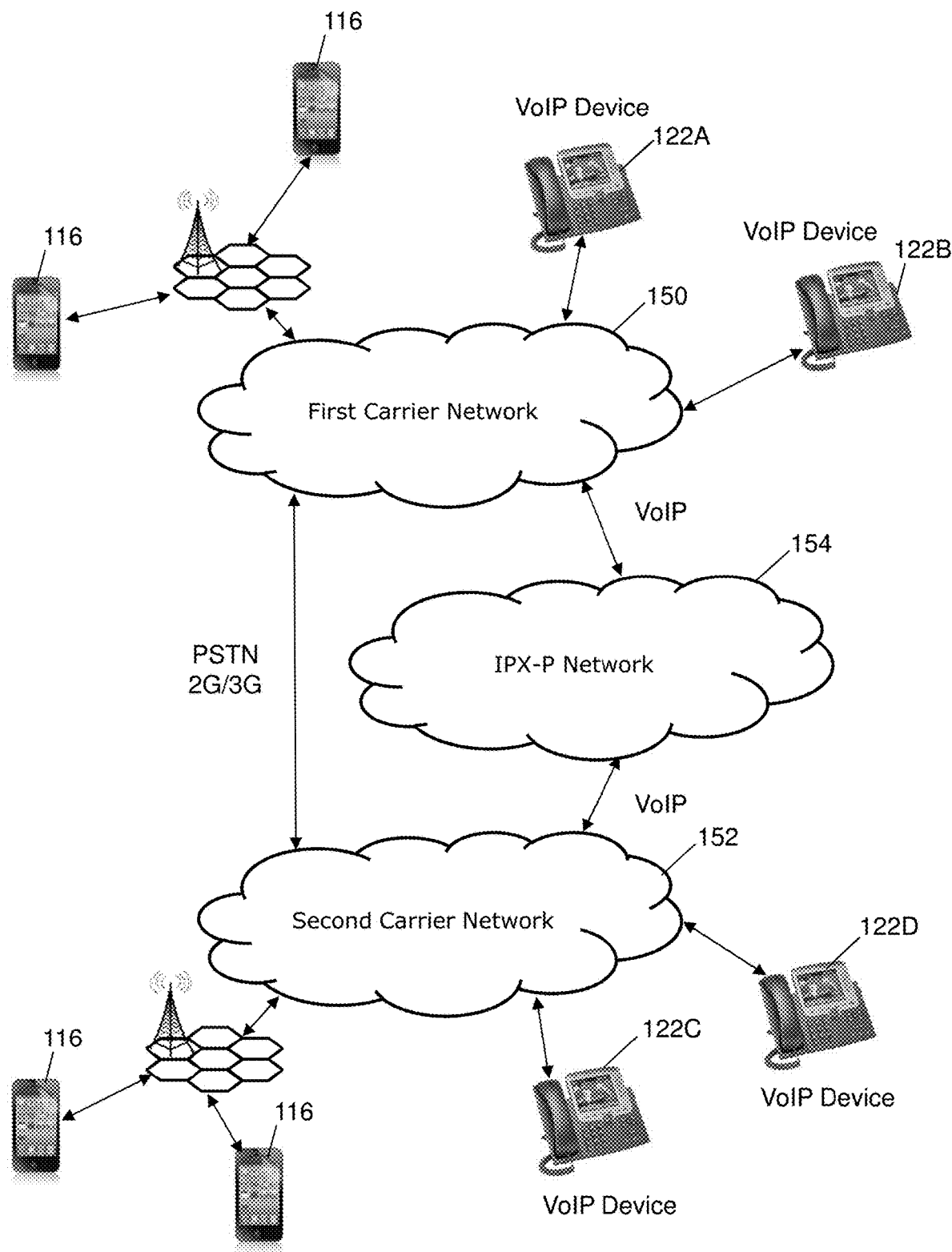
FIG. 1 depicts illustrative embodiments of a system for enabling IP carrier peering.

The subject disclosure describes, among other things, illustrative embodiments for enabling internet (IP) carrier peering. In particular, systems and methods are described for providing carrier routing for enabling subscribers of a first carrier to locate and connect with subscribers of another IP peering carrier for purposes of conducting IP call sessions, such as voice-over-IP (VoIP). An outbound IP call from a first user device of a first carrier communications network may be destined for a second user device that is associated with a second carrier communications network. The call request can be routed to a Call Session Control Function (CSCF) server, or, more particularly, a Serving CSCS (S-CSCF). The S-CSCF can perform a range check on the telephone number (TN) of the requested call session request to determine if the call is directed to a first communication network or a second communication network. If the S-CSCF determines from the call range that the requested call is directed a second device that is within the first communication carrier, then the S-CSCF can perform a query of a private tElephone Number Mapping (ENUM) of the first carrier using a domain of the first carrier to obtain a record corresponding to the called number of the second user device. However, if the S-CSCF determines from the call range that the requested call is directed to the second carrier network, then the S-CSCF can seek information for contacting this second network.

To derive the needed information, the S-CSCF can query an internetwork packet exchange (IPX) Tier 1 ENUM of an IPX partner (IPX-P) network to obtain a pointer to a Tier 2 ENUM that is hosted at the second carrier communications network. The S-CSCF may then query the Tier 2 ENUM of the second carrier based on this pointer. The Tier 2 ENUM of the second carrier can search for an entry corresponding to the called number associated with the second user device of the second carrier. The Tier 2 ENUM of the second carrier can then return a name authority pointer (NAPTR) record associated with entry to the S-CSCF. The S-CSCF can then send the NAPTR information to a session boarder controller (SBC) for routing the call to the second device. However, if the IPX Tier 1 ENUM cannot return a pointer to a Tier 2 ENUM (because it cannot find a Tier 2 ENUM corresponding to the call number), then the S-CSCF can complete the call to the second device using a non-IP session. The S-CSCF can forward the call session to its Breakout Gateway Control Function/Transit Function (BGCF/TF) for completion of the non-IP call session via either a public switched telephone network (PSTN) or a cellular 2G or 3G connection. Notably, the systems and methods only invoke the BGCF or BGCF/TF for completion of non-IP calls. Also, the private ENUM of the first carrier only needs to include the NAPTR records for the subscriber devices of the first carrier network. Call requests for devices outside of the first carrier's private ENUM are forwarded to the IPX Tier 1 ENUM so that overall call flow can be optimized. This may result in dramatically improved and timely call initiation. Furthermore, the systems and methods enables carriers to perform IP peer-to-peer with other carriers to expand their service area coverage so as to provide rich IP services. Other embodiments are described in the subject disclosure.

One or more aspects of the subject disclosure include a call session control function server including a processing system including a processor; and a memory that stores executable instructions that, when executed by the processing system, facilitate performance of operations. The processing system, responsive to executing the executable instruction, can perform operations for receiving a request originated by a first device of a first carrier network managed by a first service provider entity to initiate an internet protocol call session with a second device. The processing system can perform comparing a called number included in the request against a first calling range associated with the first carrier network and a second calling range associated with a second carrier network and, in turn, determining, according to the comparing, whether the second device is associated with the first carrier network or a second carrier network. Responsive to determining that the second device is associated with the second carrier network, the processing system can also perform operations for performing a first query to an internetwork packet exchange telephone number mapping equipment server of a partner network of the first carrier network and the second carrier network to obtain a first pointer to a second carrier network telephone number mapping equipment server according to the request, and, in turn, receiving the first pointer to the second carrier network telephone number mapping equipment server according to the first query. The processing system can further perform operations for performing a second query to the second carrier network telephone number mapping equipment server to obtain a record associated with a called number of the second device according to the first pointer, and, in turn, receiving the record associated with the called number of the second device from the second carrier network telephone number mapping equipment server according to the second query. The processing system can perform operations for determining a first internet protocol address for the second device from the record associated with the called number and, in turn, transmitting the first internet protocol address for the second device to a session border controller of the first carrier network to initiate the internet protocol call session between the first device of the first carrier network and the second device of the second carrier network.

One or more aspects of the subject disclosure include a machine-readable storage medium, including executable instructions that, when executed by a processing system including a processor, facilitate performance of operations at a call session control function server, including determining, according to request for by a first device of a first carrier network to initiate an internet protocol call session with a second device, whether the second device is associated with the first carrier network managed by a first service provider entity or a second carrier network managed by a second service provider entity. Responsive to determining that the second device is associated with the second carrier network, the processing system can also perform operations for obtaining a first pointer to a second carrier network telephone number mapping equipment server from an internetwork packet exchange telephone number mapping equipment server of a partner network of the first carrier network and the second carrier network according to the request. The processing system can perform operations for obtaining a record associated with a called number of the second device according to the first pointer from the second carrier network telephone number mapping equipment server. The processing system can perform operations for determining a first internet protocol address for the second device from the record associated with the called number, and, in turn, transmitting the first internet protocol address for the second device to a session border controller of the first carrier network to initiate the internet protocol call session between the first device of the first carrier network and the second device of the second carrier network. The processing system can perform operations for determining, according to the request, that the internet protocol call cannot be initiated between the first device of the first carrier network and the second device of the second carrier network, and, in turn, forwarding the request to a breakout gateway control function of the first carrier network to initiate a non-internet protocol call session between the first device and the second device responsive to determining that the internet protocol call cannot be initiated between the first device of the first carrier network and the second device of the second carrier network.

One or more aspects of the subject disclosure include a method. Responsive to determining that a second device is associated with a first carrier network managed by a first service provider entity, the method can include obtaining, by a processing system including a processor, a first record associated with a called number of the second device from a first carrier network telephone number mapping equipment server of the first carrier network, wherein a first device of the first carrier network provides a request for an internet protocol call session with the second device. The method also can include transmitting, by the processing system, a first internet protocol address for the second device from the first record to a terminating call session control function server of the first carrier network to initiate the internet protocol call session. Responsive to a second determination that the second device is associated with a second carrier network managed by a second service provider entity, the method can include obtaining, by the processing system, a second record associated with the called number according to a pointer to a second carrier network telephone number mapping equipment server of the second carrier network. The method can also include transmitting, by the processing system, a second internet protocol address for the second device derived from the second record to a session border controller of the first carrier network to initiate the internet protocol call session.

FIG. 1 depicts an illustrative embodiment of a system for enabling IP carrier peering. A system 100 and accompanying methods provides an architecture for enabling IP carrier peering. In particular, the system 100 may provide for carrier ENUM-based routing for subscriber devices 122A and 122B of a first carrier network 150 to locate and connect with subscriber devices 122C and 122C of another IP peering carrier 152 for full IP capable calling, such as VoIP. VoIP capable devices 122A-D, which can be wired devices 122A-D or wireless devices 116. If a first VoIP device 122A of the first carrier network 150 attempts to call a second VoIP device 122B of the same first carrier network 150, then the private ENUM of the first carrier network 150 can translate the telephone number of the second VoIP device 122B into an Internet address. This is because the private ENUM of the first carrier network 150 can easily access the Internet addresses for all of the first carrier devices. However, if the first VoIP device 122A of the first carrier network 150 attempts to call a third VoIP device 122C of the second carrier network 152, then the private ENUM will likely not be able to convert the telephone number of the third VoIP device 12C into its Internet address because the private ENUM of the first carrier network 150 does not have access to the Internet address for the second carrier devices. If the first carrier network 150 cannot determine the IP address of the VoIP device 122C that is the target of the IP call session, then first carrier network 150 will be forced to complete the call using a non-IP connection, such as a public switched telephone network (PSTN) or a cellular 2G or 3G connection. Will this form of call completion will enable voice communications, the advantages (e.g., data rate, cost of calling session, rich IP data) of an all-IP connection can be lost.

Figure 2:
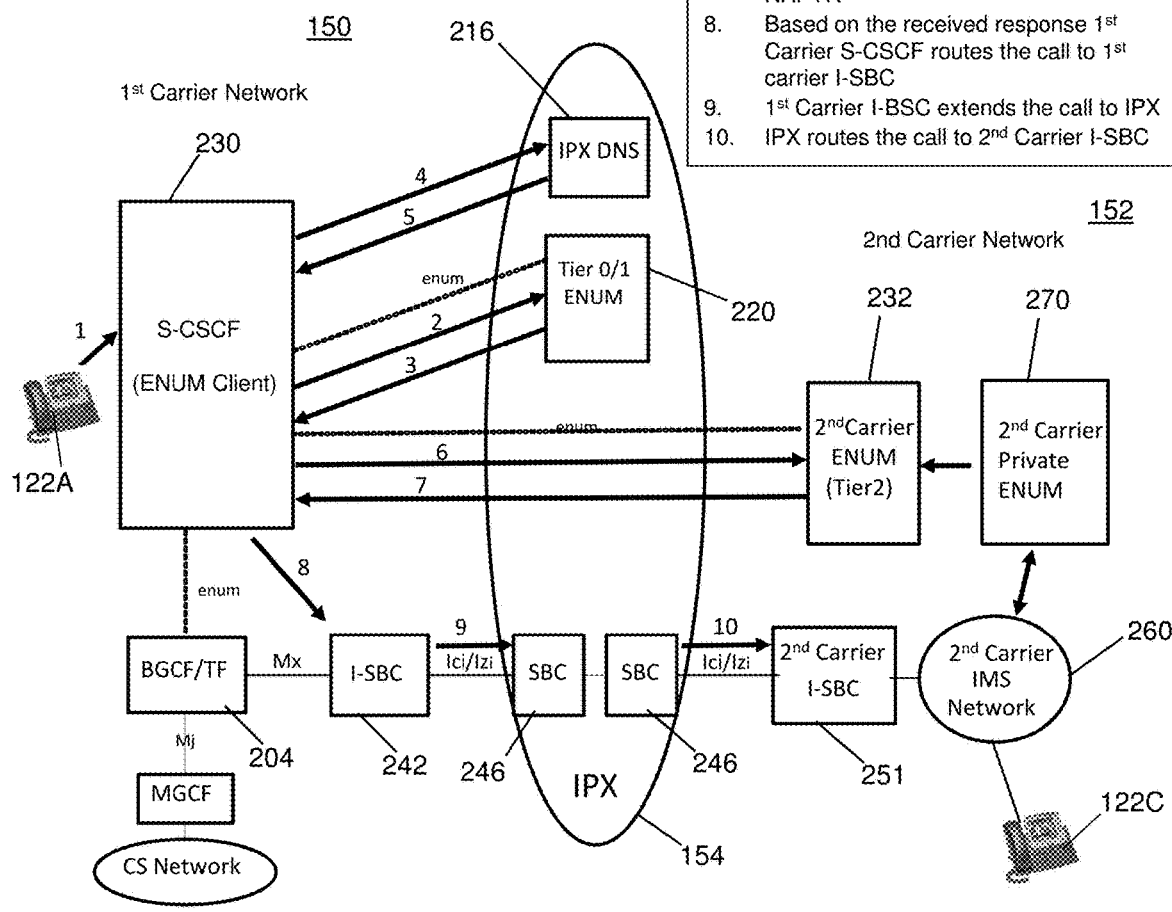
FIG. 2 depicts illustrative embodiments of a schematic diagram of the system for enabling IP carrier peering as shown in FIG. 1.

FIG. 2 depict illustrative embodiments of a schematic diagram of the system for enabling IP carrier peering as shown in FIG. 1. The embodiments show systems for enabling full Voice-over-LTE (VoLTE) carrier-to-carrier calling. In particular, FIG. 2 depicts a schematic diagram of a system 200 for enabling IP carrier-to-carrier communications. In one or more embodiments, system 200 may be configured to support content delivery services, cloud computing services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, productivity applications and services, mobile applications and services, and any other computing applications and services. The system 200 may include a first device 122A that may be utilized to access data, content, and services, or to perform a variety of other tasks and functions for a subscriber of the first carrier network 150. As an example, the first device 122A may be used to make one or more IP-based calls (or other types of calls) to devices of other subscribers of the first carrier network 150, to a second device 122C of a subscribers of a second carrier network 152, or to devices of subscribers of any other carrier. In one or more embodiments, the first device 122A may be a computer, a laptop, a tablet device, a phablet, a server, a mobile device, a smartphone, a smart watch, or any other type of computing device.

In one or more embodiments, the system 200 may also include a second device 122C that may be used by a subscriber to the second carrier network 152 to also access data, content, and services, and to perform a variety of other functions. For example, the second device 122C may also be used to transmit signals to request various types of content, services, and data provided by content and service providers associated with the second carrier network 152 or any other network in the system 200. Also, the second device 122C may be used to make one or more IP-based calls (or other types of calls) to devices of other subscribers of the second carrier network 152, devices of subscribers of the first carrier network 150, or devices of subscribers of any other carrier. Similar to the first device 122A, in one or more embodiments, the second device 122C may be a computer, a laptop, a tablet device, a phablet, a server, a mobile device, a smartphone, a smart watch, or any other type of computing device.

In one or more embodiments, the system 200 may also include a first carrier communications network 150 that may be configured to link each of the devices in the system 200 to one another. For example, the first carrier communications network 150 may be utilized by the first device 122A to connect with other devices within or outside first carrier communications network 150. Additionally, the first carrier communications network 150 may be configured to transmit, generate, and receive any information and data traversing the system 200. In one or more embodiments, the first carrier communications network 150 may include any number of servers, databases, or other componentry. The first carrier communications network 150 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. In one or more embodiments, the first carrier communications network 150 may be part of a single autonomous system that is located in a particular geographic region, or be part of multiple autonomous systems that span several geographic regions.

The first carrier communications network 150 may include a series of components to facilitate communications and the functions of the first carrier communications network 150. In particular, the first carrier communications network 150 may include a first carrier, serving call session control function (S-CSCF) 230, to which control signals from a first device 122A may be routed when making an IP-based call. In one or more embodiments, the first carrier communications network 150 may include an interconnect-SBC (I-SBC) 242 that may reside at a boundary of the first carrier communications network 150, where different networks may interconnect or peer with the first carrier communications network 150. For example, the I-SBC may provide an interconnect routing to an IPX-P network 154 and/or the second carrier communications network 152. The first carrier communications network 150 may also include a first carrier private ENUM that may conform to an Internet Engineering Task Force (IETF) ENUM standard. The private ENUM may also include any of the functions and features of a traditional private ENUM and may be private to the first carrier communications network 150. In one or more embodiments, the first carrier communication network 150 may include a Breakout Gateway Control Function/Transit Function (BGCF/TF) 204. The BGCF/TF 204 can provide a pathway for completing non-IP (and non-VoIP) calls via PSTN or 2G/3G networks.

In one or more embodiments, the S-CSCF 230 can perform a series of actions to initiate an IP calling session between the first device 122A and the second device 122C. In one or more embodiments, the S-CSCF 230 can analyze the call request to determine whether the second device 122C is associated with the first carrier network 150 or the second carrier network 152. In one embodiment, the S-CSCF 230 can extract a called number from the call request. The called number can be the telephone number of the second device 122C. The called number can be consistent with a numbering plan area (NPA) code and/or a central office code (NXX). The S-CSCF 230 can compare the NPA and/or NXX code from the called number to a first range that is associated with the first carrier network 150 to determine if the called number is for a second device 122C that is associated with (e.g., subscribed to) the first carrier network 150. The S-CSCF 230 can optionally or additionally compare the NPA and/or NXX code from the called number to a second range that is associated with a second carrier network 152 to determine if the called number is for a second device 122C that is associated with (e.g., subscribed to, currently operating in) the second carrier network 152.

In one or more embodiments, the S-CSCF 230 determine that the first device 122A and the second device 122C are both operating in the first carrier network 150. In this case, the S-CSCF 230 can access a private ENUM service, which can be included in the S-CSCF 230. The private ENUM of the first carrier network can include NAPTR records and DNS records and can use NAPTR records and DNS records for translating telephone numbers into URI addresses and/or IP addresses for first devices 122A of the first carrier communications network 150. In one embodiment, if the private ENUM service returns a NAPTR record for the second device 122C of the first carrier network 150, then the S-CSCF 230 can initiate an IP-call via a peer-to-peer connection between the first device 122A and the second device 122C using the IMS Carrier Network of the first carrier network 150. However, if the private ENUM of the S-CSCF 230 does not return a NAPTR record for the second device 122C to the S-CSCF 230, then the S-CSCF 230 can determine that it must complete the call session using a non-IP technique. The S-CSCF 230 can forward the call request to a Breakout Gateway Control Function/Transit Function (BGCF/TF) 204 of the first communication network 150. The BGCF/TF 204 can provide a pathway for completing the non-IP (and/or non-VoIP) call between the first device 122A and the second device 122C via PSTN or 2G/3G networks.

In one or more embodiments, the S-CSCF 230 can determine that the first device 122A is operating in the first communication network 150, while the second device 122C is operating in the second carrier network 152. In this case, the S-CSCF 230 can determine that it must obtain the needed NAPTR record from outside of the first carrier communications network 150. In one embodiment, the S-CSCF 230 can obtain the NAPTR record for the second device 122C from the IPX-P network 154 and/or the second carrier network 152 and thus relieve the administrative and communication burden of procuring the NAPTR record for a second carrier network device from the 1$^{st}$ Carrier Network 150. In one embodiment, the call request can include a domain. For example, the call request can include a domain of "e164.arpa," which is associated with the domain of the first carrier network 150. The "e164.arpa" domain can be consistent with the private ENUM service of the S-CSCF 230. If the S-CSCF 230 determines that the first device 122A and the second device 122C are both in the first communication network 150, then the S-CSCF 230 can search the first carrier private ENUM service for the NAPTR of the second device 122C using the call request including the "e164.arpa" domain. However, if the S-CSCF 230 determines that the first device 122A is operating in the first communication network 150, while the second device 122C is operating in the second carrier network 152, then the S-CSCF 230 can modify the call request to the change the domain to one consistent with an inter-carrier apex (IPX) domain, such as "e164enum.net." By modifying the call request information to the "e164enum.net" domain, the S-CSCF 230 can query the IPX Tier 0/1 ENUM 220 with a format that is consistent with its database.

In one or more embodiments, the S-CSCF 230 can query the IPX Tier 0/1 ENUM 220, using the telephone number of the second device modified to the inter-carrier ENUM apex domain. The IPX Tier 0/1 ENUM 220 can return a pointer to a second carrier Tier 2 ENUM 232. If the pointer includes a URI for the second carrier Tier 2 ENUM 130, but not an IP address, then the S-CSCF 230 can resolve the URI into the IP address by querying a DNS server, such as an IPX DNS 216. In one embodiment, once the S-CSCF 230 has the IP address of the second carrier Tier 2 ENUM 232, the S-CSCF 230 can query a second carrier Tier 2 ENUM 232 for the NAPTR record of the second device 122C. The S-CSCF 230 can then return a NAPTR record to the S-CSCF 230, which can then route the IP call through I-SBC 242 of the first carrier, SBCs 246 of the IPX-P network 154, I-SBC 251 of the second carrier, and an IMS network 260 of the second carrier communication network 152 to complete a connection between the first device 122A and the second device 122C and provide a full-IP capability.

In one or more embodiments, the system 200 may further include an IPX-P network 154. The IPX-P network 154 of the system 200 may be configured to link each of the devices and/or networks in the system 200 to one another. The IPX-P network 154 may be a partner network of the first carrier communications network 150 and/or a partner network of the second carrier communications network 152. Additionally, the IPX-P network 154 may be configured to transmit, generate, and receive any information and data traversing the system 200. In one or more embodiments, the IPX-P network 154 may include any number of servers, databases, or other componentry. The IPX-P network 154 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network or any combination thereof. In one or more embodiments, the IPX-P network 154 may be part of a single autonomous system that is located in a particular geographic region, or be part of multiple autonomous systems that span several geographic regions.

In one or more embodiments, the IPX-P network 154 may include a series of SBCs 246 that may be utilized to exert control over signaling associated with communications, such as calls, traversing through the IPX-P network 154, and may include any functionality associated with a session border controller. The IPX-P network 154 may further include an IPX Tier 0/1 ENUM 220. The IPX Tier 0/1 ENUM 220 may be a higher tiered ENUM as compared to other ENUMs in the system 200. The IPX Tier 0/1 ENUM 220 may store name server records including information and IP addresses for Tier 2 ENUMs 232 of various networks that are partnered with the IPX-P network 154. For example, the IPX Tier 0/1 ENUM 220 may include a DNS A record containing IP address information or a name server (NS) record with FQDN pointers to the Tier 2 ENUM 232 of the second carrier network 152 or of the first carrier network 150. In one or more embodiments, the IPX Tier 0/1 ENUM 220 may store A and name server records for Tier 2 ENUMs and/or for any type of devices in other partner networks.

In one or more embodiments, the IPX-P network 154 can further include an IPX domain name server (IPX DNS) 216. The IPX DNS 216 can include DNS records for use in converting NS records into IP addresses. In one embodiment, the S-CSCF 230 can query the IPX DNS 216 of the IPX-P network 154, using a NS record that it has obtained for the second carrier Tier 2 ENUM 232. The IPX DNS 216 can resolve the FQDN of the NS record to the correct IP address so that the S-CSCF 230 can query the second carrier Tier 2 ENUM 232. The Tier 0/1 ENUM 220 can return either an NS record or an A record to the S-CSCF server 230. If the Tier 0/1 ENUM 220 only returns an NS record return, then the S-CSCF server 230 will need assistance from the IPX DNS 216 to resolve the NS/FQDN to an IP address. If the Tier 0/1 ENUM 220 returns an A record, which includes the IP address, then the S-CSCF server 230 will not need the assistance from the IPX DNS 216 to resolve the address.

In one or more embodiments, the system 200 may also include a second carrier communications network 152. The second carrier communications network 152 of the system 200 may be configured to link each of the devices in the system 200 to one another. For example, the second carrier communications network 152 may be utilized by the second user device 122C to connect with other devices within or outside second carrier communications network 152. Additionally, the second carrier communications network 152 may be configured to transmit, generate, and receive any information and data traversing the system 200. In one or more embodiments, the second carrier communications network 152 may include any number of servers, databases, or other componentry. The second carrier communications network 152 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof. In o embodiments, the second carrier communications network 152 may be part of a single autonomous system that is located in a particular geographic region, or be part of multiple autonomous systems that span several geographic regions.

In one or more embodiments, the second carrier communications network 152 may include a series of components to facilitate communications and the functions of the second carrier communications network 152. In particular, the second carrier communications network 152 may include I-SBCs 251, which may include any of the functions of a traditional session border controller. For example, a second carrier I-SBC 251 may reside at a border of the second carrier communications network 152 and may exert control over signaling associated with communications, such as calls, traversing through the second carrier communications network 152. The second carrier communications network 152 may also include a second carrier Tier 2 ENUM 232 that may include any of the functionality of a traditional Tier 2 ENUM. Tier 2 ENUM 234 may utilize DNS records to translate telephone numbers into a URI or IP address that may be utilized in IP-based communications.

In one or more embodiments, the second communication network 150 can include a private ENUM server 270. The second carrier private ENUM 270 can include NAPTR records and DNS records and can use NAPTR records and DNS records for translating telephone numbers into URI addresses and/or IP addresses for subscriber devices of the second carrier communications network 152. In one embodiment, if the second carrier private ENUM 270 can include NAPTR records for devices subscribed to the second communication network 152 but not those of the first communication network 150 or other networks. In one or more embodiments, the second carrier private ENUM 270 can store NAPTR records, which can be copied to the second carrier Tier 2 ENUM 232.

Figure 3:
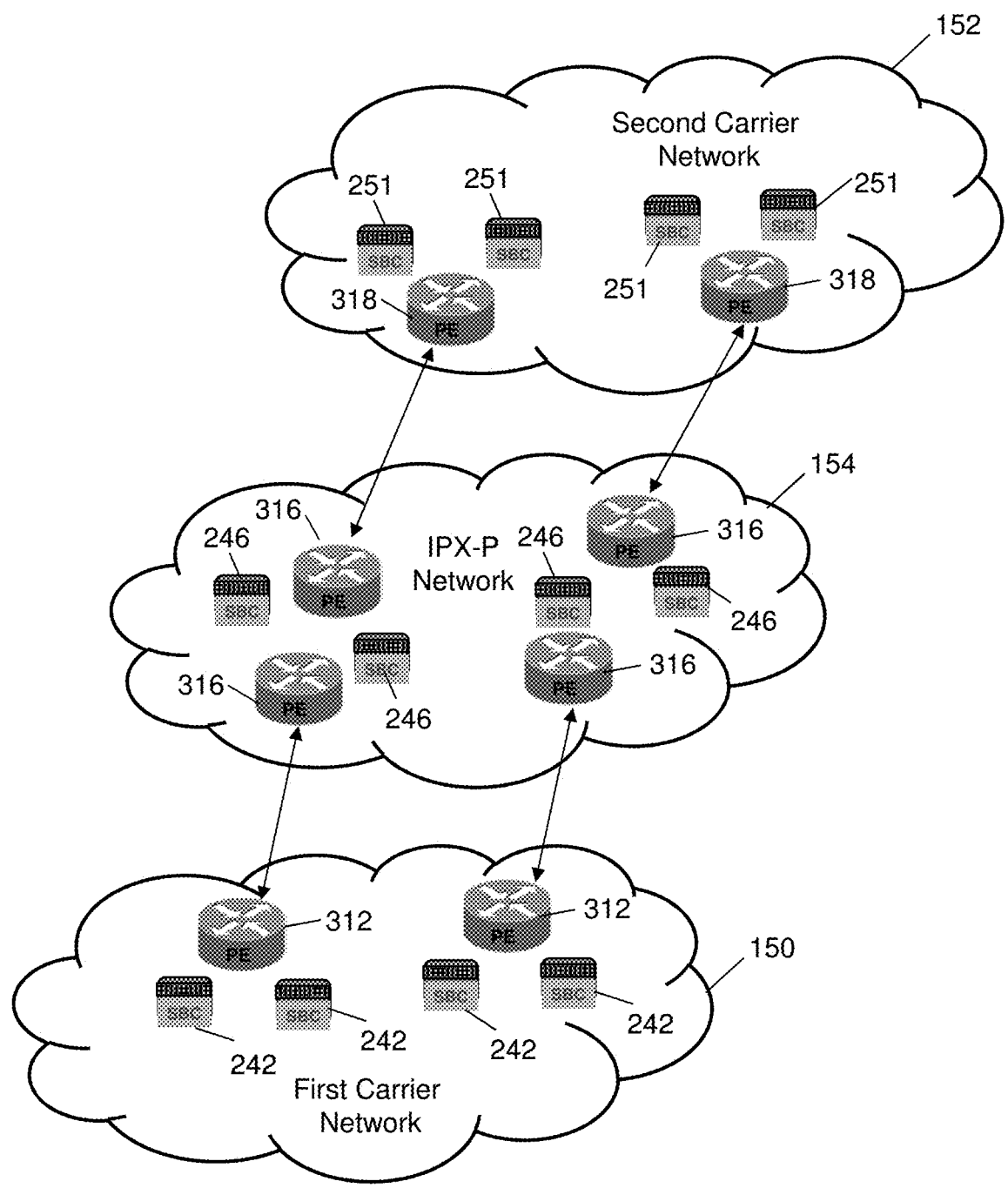
FIG. 3 depicts illustrative embodiments of a schematic diagram illustrating IPX interconnection between a first carrier network, an IPX-P network, and a second carrier network.

FIG. 3 depicts an illustrative embodiment of a schematic diagram illustrating a system 300 showing the IPX interconnection between a first carrier network 150, an IPX-P network 154, and a second carrier network 152. The first carrier network 150 can provide edge devices 312 (e.g., routers) that can be used for connecting the first carrier network to the other networks in the system 300. The IPX-P network 154 may include any number of provider edge devices 316 (e.g. routers) that may be used to connect the IPX-P network 154 to the other networks in the system 300. The second carrier network 152 may include any number of provider edge devices 318 (e.g. routers) that may be utilized to connect the second carrier network 152 to the other networks in the system 300.

Figure 4A:
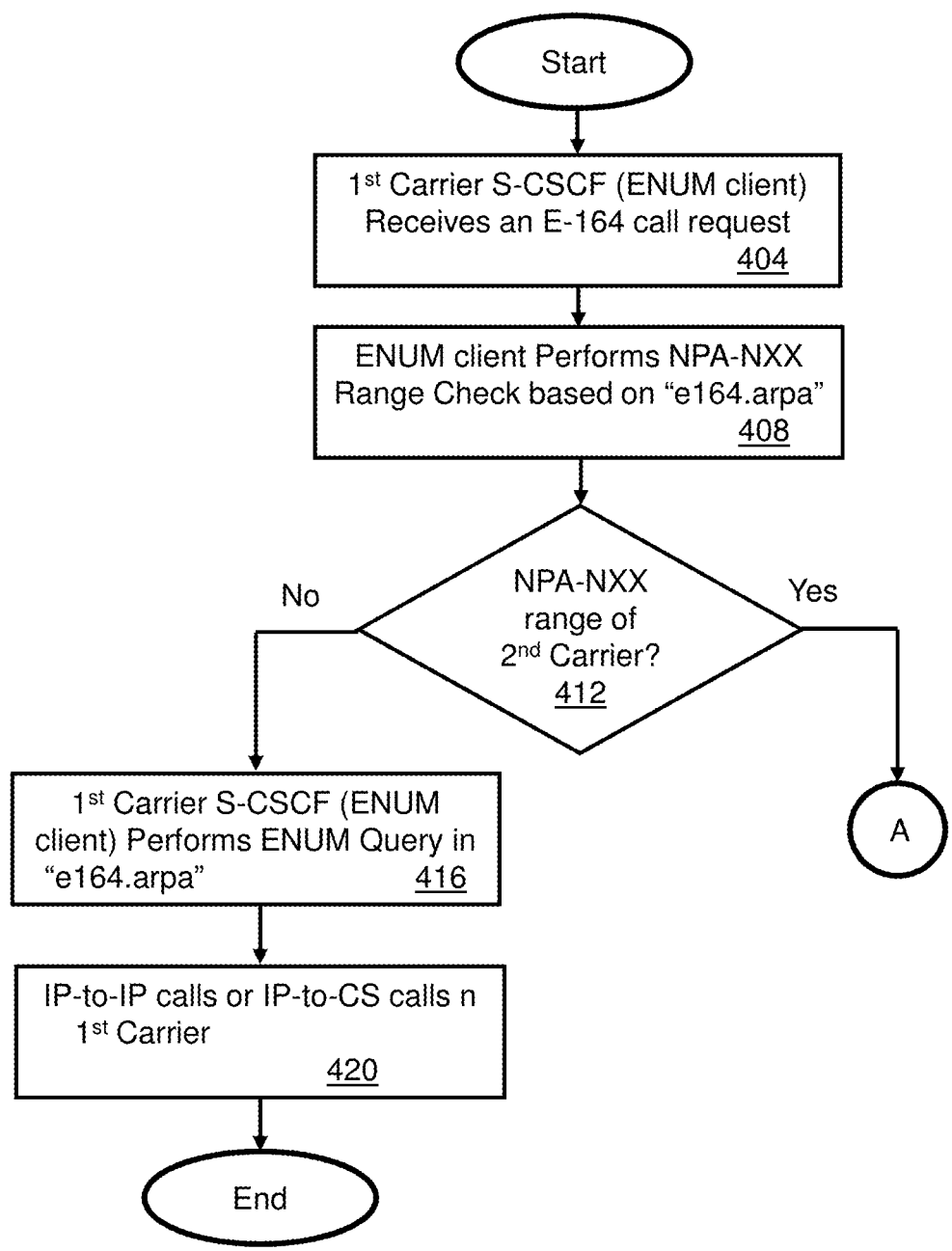
FIGS. 4A-4B depict illustrative embodiments of a method used in portions of the system described in FIGS. 1-3.
Figure 4B:
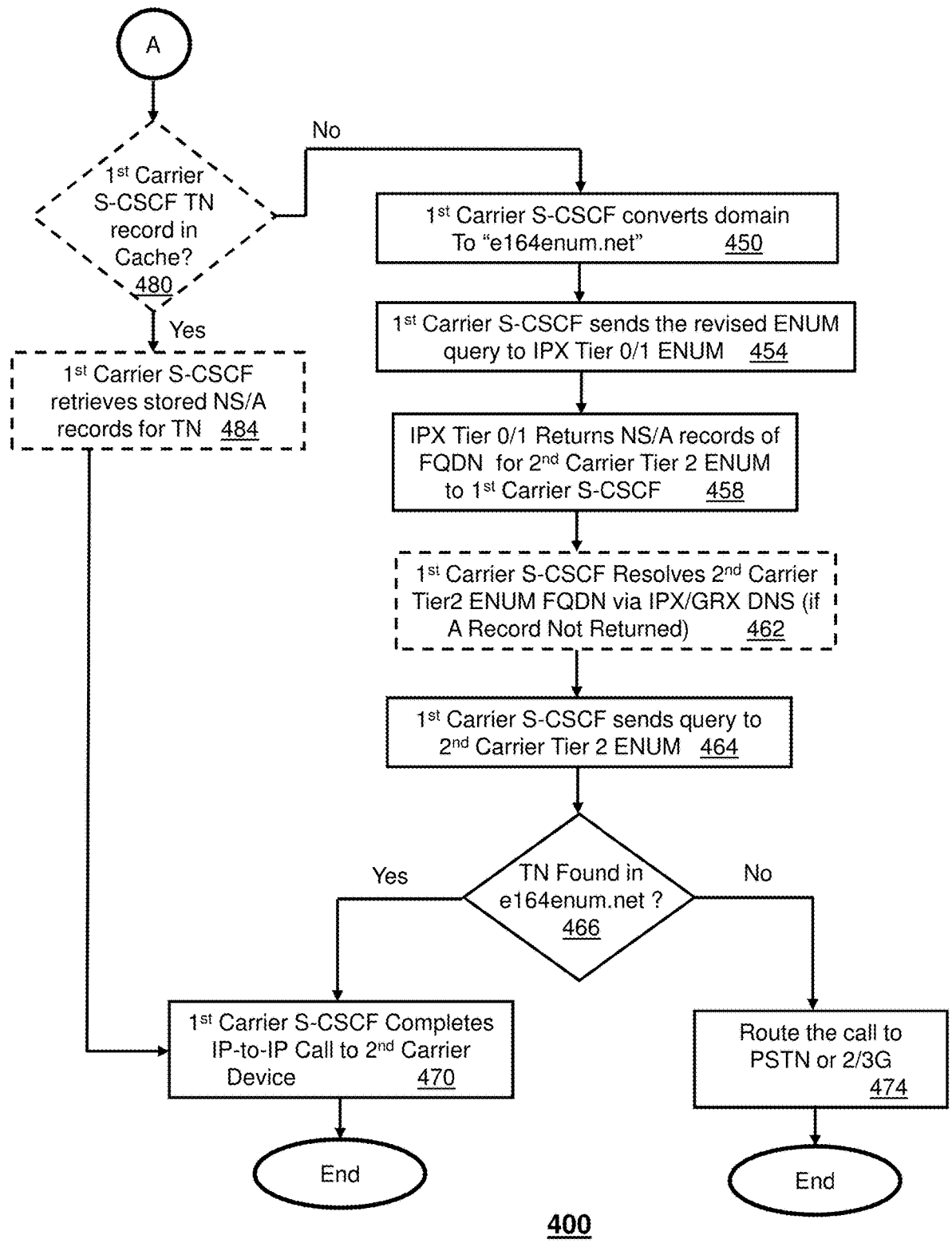

FIGS. 4A-4B depict illustrative embodiments of a method used in portions of the system described in FIGS. 1-3. While for purposes of simplicity of explanation, the respective processes are shown and described as a series of blocks in FIGS. 4A-4B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As shown in FIGS. 4A-4B, an exemplary method 400 for enabling IP carrier peering is schematically illustrated. The method 400 include steps for processing an IP based call (e.g. a VoLTE call) from a first device 122A of a first carrier network 150 to a second device 122C of a second carrier network in accordance with the disclosure provided herein. The method 400 may include, at step 404, a request to establish an IP-based call that can be received by an S-CSCF 230 of a first carrier communications network 150. Initially, the first device 122A may initiate a call (e.g. IP-based call) intended for the second device 122C. In response to receiving the call request from first device 122A of the first carrier network 150, the S-CSCF 230 can extract a called number (i.e., the telephone number of the second device 122C) from the call request. The S-CSCF 230 can then perform a range check on the telephone number to determine, in steps 408-412 of FIG. 4A (Flow 2 of FIG. 2), if the number falls in the range of the first carrier network 150 or the second carrier network 152. If the number falls in the first range (i.e., the range of the first carrier network 150), then the second device 122C is within the first carrier network 150, and the S-CSCF 230 can proceed to steps 416-420 to process the call. If the number falls in the second range (i.e., the range of the second carrier network 152), then the second device 152C is within the second carrier network 150, and the S-CSCF 230 can proceed to steps 450-476 for processing the call.

In step 416, the S-CSCF 230 may query a private carrier ENUM of the first carrier using the called number (e.g. E-164 number) of the second device 122C of the second carrier in step 408. The query may include a domain associated with the first carrier, such as "e164.arpa," which may be the domain configured with the ENUM client, and which is, in this case, the S-CSCF 230. In one or more embodiments, the query of the first carrier private ENUM may include the called number appended as <reverse telephone number>.1.e164.arpa, which is sent to the first carrier private ENUM 218 as "$ORIGIN 1.1.1.1.2.2.2.1.5.1.e164.arpa." In one or more embodiments, the first carrier private ENUM can search for a NAPTR record for the second device 122C. If the second device 122C was a subscriber device for the first carrier network 150, then the first carrier private ENUM may find and return a NAPTR record for the second device 122C. The S-CSCF 230 can, if necessary, perform a DNS lookup to resolve a domain name or URL from the NAPTR to an IP address. The S-CSCF 230 can use this IP address to route the requested IP call between the first device 122A and the second device 122C within the first carrier communications network 150 at step 420. However, if the NAPTR for the second device 122C cannot be found by the first carrier private ENUM, then the S-CSCF 230 can forward the call request to a BGCF/TF 204 of the first carrier network 150, where it can be completed via PSTN or 2G/3G networks.

In one or more embodiments, if the S-CSCF 230 determines that the second device 122C belongs to the second carrier network 152, in step 412, then the S-CSCF 230 can modify the query to include the inter-carrier ENUM apex domain, such as "e164enum.net," in step 450. The S-CSCF 230 can then send the modified query with the inter-carrier ENUM apex domain to the ENUM server 220 of the IPX network in step 454 (Flow 3 of FIG. 2). In one or more embodiments, the Tier 0/1 ENUM server 230 can search its database for an address for the Tier 2 ENUM server 230 of the second carrier network 152 and can return an address with NS and A records containing the FQDN of the Tier 2 ENUM server 230 in step 458 (Flow 3 of FIG. 2). If the address includes a NS record (FQDN) for the second carrier Tier 2 ENUM 232 but not an A record, then the S-CSCF 230 can resolve the FQDN into the IP address by querying a DNS server, such as an IPX DNS 216, in step 462 (Flows 4 and 5 in FIG. 2). However, if the A record, which already includes the IP address, is returned, then step 462 (and Flows 4-5 of FIG. 2) can be omitted. In one embodiment, once the S-CSCF 230 has received the IP address of the second carrier Tier 2 ENUM 232, the S-CSCF 230 can query the second carrier Tier 2 ENUM 232 for the NAPTR record of the second device 122C in step 464 (Flow 6 and 7 of FIG. 2). The Tier 2 ENUM 232 can then return the NAPTR record to the S-CSCF 230.

In one or more embodiments, if the Tier 2 ENUM 232 returns the NAPTR record to the S-CSCF 230 in step 466 (Flow 8 of FIG. 2), then the S-CSCF 230 can complete the IP peer-to-peer call between the first device 122A and the second device 122C in step 470 (Flows 9 and 10 of FIG. 2). The S-CSCF 230 can then route the IP call through the I-SBC 242 of the first carrier network 150 and the SBCs 246 and 251 of the IPX-P network 154 and the second carrier network 152, respectively, to connect the first device 122A and the second device 122C and provide a full-IP capability. If the Tier 2 ENUM 232 does not return the NAPTR record for the second device 122C, then the S-CSCF 230 can, in step 474, forward the call request to the BGCF/TF 204 of the first carrier network 150 for completion of a non-IP call between the first device 122A and the second device 122C via Public Switched Telephone Network (PSTN), a 2G network, a 3G network, another network, or any combination thereof.

In one or more embodiments, the S-CSCF 230 can optionally include a Cache for storing NAPTR pointers of second devices 122C that have been subject to previous IP call sessions. In particular, whenever an IP call session is completed, the S-CSCF 230 can store the NAPTR information for the second device 122C. If the optional feature is present, then, in step 480, the S-CSCF 230 can search its cache whenever the S-CSCF 230 determines that the second device 122C belongs to a second carrier network 152. If the S-CSCF 230 the finds a stored NAPTR record for the call number of the second device 122C in step 480, then the S-CSCF 230 can retrieve the stored NS and/or A records, in step 484, from the cache and use these records to complete the IP call in step 470.

Figure 5:
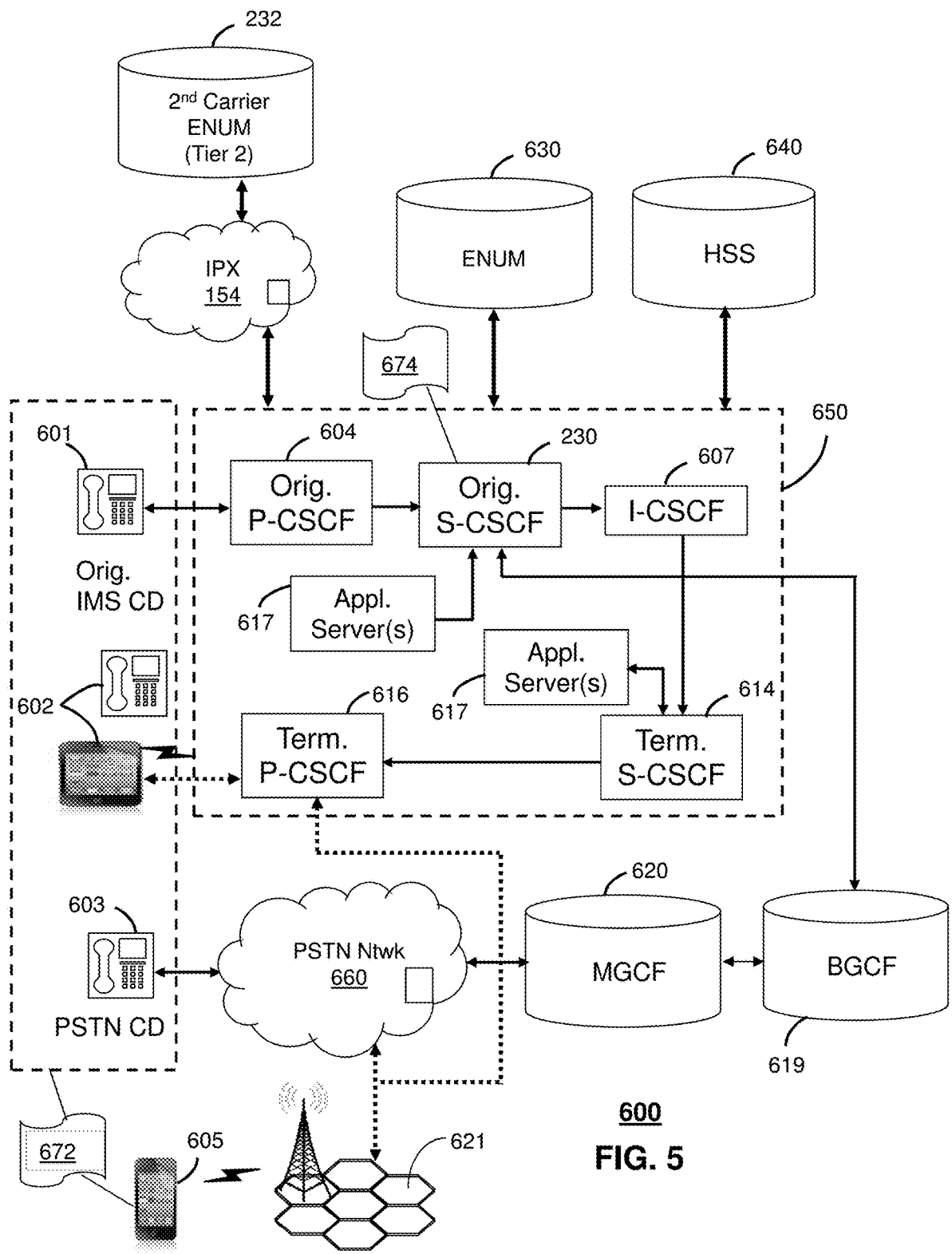
FIG. 5 depict illustrative embodiments of communication systems that provide telecommunication and media services according to the system of FIGS. 1-3.

FIG. 5 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with systems 100-300 of FIGS. 1-3, which can perform operations for, responsive to determining that a second device is associated with a first carrier network, obtaining a first record associated with a called number of the second device from a first carrier network telephone number mapping equipment server of the first carrier network, and transmitting a first internet protocol address for the second device from the first record to a terminating call session control function server of the first carrier network to initiate the internet protocol call session. Responsive to a second determination that the second device is associated with a second carrier network, obtaining a second record associated with the called number according to a pointer to a second carrier network telephone number mapping equipment server of the second carrier network, and transmitting a second internet protocol address for the second device derived from the second record to a session border controller of the first carrier network to initiate the internet protocol call session.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 230. The originating S-CSCF 230 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 230 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

Additionally, the originating S-CSCF 230 can perform operations for, responsive to determining that a second device is associated with a first carrier network, obtaining a first record associated with a called number of the second device from a first carrier network telephone number mapping equipment server of the first carrier network, and transmitting a first internet protocol address for the second device from the first record to a terminating call session control function server of the first carrier network to initiate the internet protocol call session. Responsive to a second determination that the second device is associated with a second carrier network, obtaining a second record associated with the called number according to a pointer to a second carrier network telephone number mapping equipment server 232 of the second carrier network, and transmitting a second internet protocol address for the second device derived from the second record to a session border controller of the first carrier network to initiate the internet protocol call session.

In some instances the aforementioned communication process is symmetrical. Accordingly, the terms "originating" and "terminating" in FIG. 5 may be interchangeable. It is further noted that communication system 600 can be adapted to support video conferencing.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 5. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The S-CSCF 230 can be operably coupled to communication system 600 for purposes similar to those described above. S-CSCF 230 can perform function 562 and thereby provide services to enable carrier peering for IP calls for the CDs 501, 602, 603 and 605 of FIG. 5, similar to the functions described for S-CSCF 230 of FIG. 2 in accordance with method 400 of FIGS. 4A-B. CDs 601, 602, 603 and 605, which can be adapted with software to perform function 672 to utilize the services of the S-CSCF 230 similar to the functions described for communication devices 116 and 122A-D of FIGS. 1-3 in accordance with method 400 of FIGS. 4A-4B. S-CSCF 230 can be an integral part of the application server(s) 617 performing function 674, and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
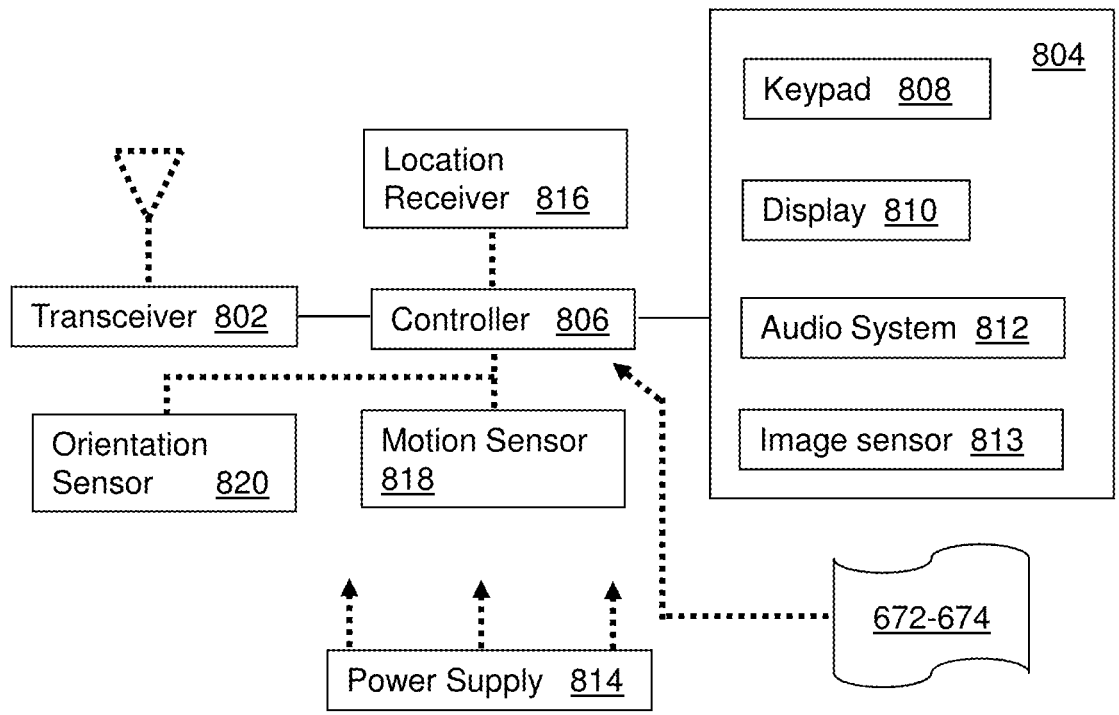
FIG. 6 depicts an illustrative embodiment of a communication device.

FIG. 6 depicts an illustrative embodiment of a communication device 800. Communication device 800 can serve in whole or in part as an illustrative embodiment of the devices depicted in FIGS. 1-3 and FIG. 5 and can be configured to perform portions of method 400 of FIGS. 4A and 4B.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 6 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 6. These variant embodiments can be used in one or more embodiments of the subject disclosure.

The communication device 800 can be adapted to perform the functions of devices of FIGS. 1-3, the portable communication devices 605 of FIG. 5, as well as the IMS CDs 601-602 and PSTN CDs 603-605 of FIG. 5. It will be appreciated that the communication device 800 can also represent other devices that can operate in systems of FIGS. 1-3, communication system 600 of FIG. 5 such as a gaming console and a media player. In addition, the controller 806 can be adapted in various embodiments to perform the functions 672-674, respectively.

Upon reviewing the aforementioned embodiments, it would be evident to an artisan with ordinary skill in the art that said embodiments can be modified, reduced, or enhanced without departing from the scope of the claims described below. For example, the IPX Tier 0/1 ENUM 220 can resolve whether an IP call between the first device 122A of the first carrier network 150 and the second device 122C of the second carrier network 152 is portable by querying a portability database. The IPX Tier 0/1 ENUM 220 can query the portability database using the telephone number of the second device 122C, coupled with the inter-carrier ENUM apex domain, to determine a service profile identifier (SPID) for a the carrier network of the second device 122C. If the carrier network, in this case the second carrier network 152, is participating, then the portability database will return the SPID for the second carrier network 152. In one embodiment, the IPX Tier 0/1 ENUM 220 can convert the SPID into a pointer for the second carrier network 152 by mapping the SPID to an N2 record and/or an A record.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
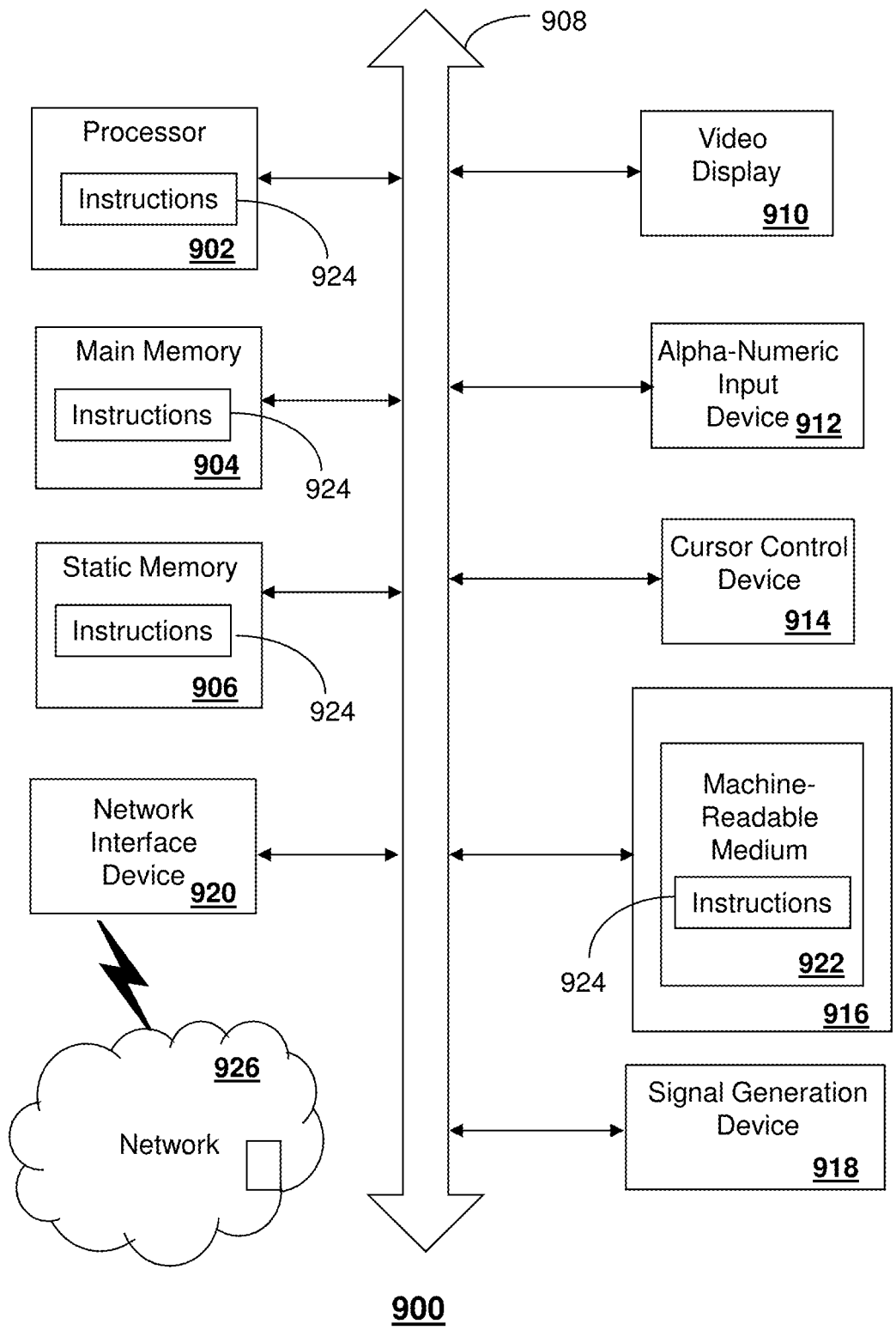
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 900 within which a set of instructions, when executed, may cause the machine to perform any one or more of the methods described above. One or more instances of the machine can operate, for example, as the ENUM cache 530, the mobile communication device 116, the IP calling devices 122A-D, S-CSCF 230, and other devices of FIGS. 1-3. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and/or HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A call session control function server, comprising:
    a processing system including a processor; and
    a memory that stores executable instructions that, when executed by the processing system, perform operations, the operations comprising:
    receiving a request originated by a first device of a first carrier network to initiate an internet protocol call session with a second device; and
    responsive to determining that the second device is associated with a second carrier network:
        performing a first query to an internetwork packet exchange telephone number mapping (ENUM) equipment server of a third network to obtain a first pointer to a second carrier network telephone number mapping (ENUM) equipment server according to the request;
        performing a second query to the second carrier network telephone number mapping equipment server to obtain a record associated with a called number of the second device according to the first pointer;
        determining a first internet protocol address for the second device from the record associated with the called number; and
        transmitting the first internet protocol address for the second device to a controller of the first carrier network to initiate the internet protocol call session between the first device of the first carrier network and the second device of the second carrier network, wherein the determining that the second device is associated with the second carrier network is based on a comparison of the called number against a first calling range associated with the first carrier network and a second calling range associated with the second carrier network, wherein the comparison is performed according to a numbering plan area (NPA), a central office code (NXX), or a combination thereof.

2. The call session control function server of claim 1, wherein the operations further comprise:
    determining whether the request includes an intra-carrier network domain identifier of the first carrier network; and
    modifying the request to change the intra-carrier network domain identifier to an inter-carrier network domain identifier to generate the first query.

3. The call session control function server of claim 1, wherein the operations further comprise:
    determining, according to the request, that the internet protocol call session cannot be initiated between the first device of the first carrier network and the second device of the second carrier network; and forwarding the request to a breakout gateway control function of the first carrier network to initiate a non-internet protocol call session between the first device and the second device responsive to determining that the internet protocol call session cannot be initiated between the first device of the first carrier network and the second device of the second carrier network.

4. The call session control function server of claim 1, wherein, responsive to determining that the second device is associated with the second carrier network, the operations further comprise:

determining whether the first pointer to the second carrier network telephone number mapping equipment server does not include a second internet protocol address for the second carrier network telephone number mapping equipment server; and performing a third query to a domain name system server for obtaining the second internet protocol address for the second carrier network telephone number mapping equipment server according to a uniform resource identifier that is derived from the first pointer.

5. The call session control function server of claim 4, wherein the operations further comprise receiving the second internet protocol address for the second carrier network telephone number mapping equipment server from the domain name system server according to the third query.

6. The call session control function server of claim 1, wherein, responsive to determining that the second device is associated with the first carrier network, the operations further comprise:

obtaining a second record associated with the called number from a first carrier network telephone number mapping (ENUM) equipment server (ENUM) according to the request;

determining a second internet protocol address for the first second device from the second record associated with the called number that is received; and transmitting the second internet protocol address for the second device to a terminating call session control function server of the first carrier network to initiate the internet protocol call session between the first device of the first carrier network and the second device of the first carrier network.

7. The call session control function server of claim 6, wherein the operations further comprise:

performing a third query to the first carrier network telephone number mapping equipment server to obtain the second record associated with the called number according to the request; and receiving the second record associated with the called number according to the third query.

8. The call session control function server of claim 1, wherein, responsive to determining that the second device is associated with the second carrier network, the operations further comprise:

determining whether the memory includes a saved record associated with the called number; and retrieving the first internet protocol address for the second device from the saved record associated with the called number.

9. The call session control function server of claim 8, wherein the operations further comprise storing the record associated with the second device in the memory.

10. The call session control function server of claim 1, wherein the request that is received is a session initiation protocol message.

11. A non-transitory machine-readable storage medium, comprising executable instructions that, when executed by a processing system including a processor, perform operations at a server, the operations comprising:

determining, according to a request by a first device of a first carrier network to initiate an internet protocol call session with a second device, whether the second device is associated with the first carrier network or a second carrier network; and responsive to determining that the second device is associated with the second carrier network:

performing a first query to an internetwork packet exchange telephone number mapping (ENUM) equipment server of a third network according to the request;

obtaining, according to the first query, a first pointer to the second carrier network telephone number mapping (ENUM) equipment server from the internetwork packet exchange telephone number mapping equipment server of the third network;

obtaining a record associated with a called number of the second device according to the first pointer from the second carrier network telephone number mapping equipment server;

determining a first internet protocol address for the second device from the record associated with the called number; and transmitting the first internet protocol address for the second device to a controller of the first carrier network to initiate the internet protocol call session between the first device of the first carrier network and the second device of the second carrier network.

12. The non-transitory machine-readable storage medium of claim 11, wherein the obtaining the first pointer comprises:

receiving the first pointer from the internetwork packet exchange telephone number mapping equipment server of the third network.

13. The non-transitory machine-readable storage medium of claim 12, wherein, responsive to determining that the second device is associated with the second carrier network, the operations further comprise:

performing a second query to the second carrier network telephone number mapping equipment server according to the first pointer; and receiving the record associated with the called number of the second device according to the second query.

14. The non-transitory machine-readable storage medium of claim 11, wherein, responsive to determining that the second device is associated with the second carrier network, the operations further comprise:

determining whether the request includes an intra-carrier network domain identifier of the first carrier network; and modifying the request to change the intra-carrier network domain identifier to an inter-carrier network domain identifier to obtain the first pointer from the internetwork packet exchange telephone number mapping equipment server.

15. The non-transitory machine-readable storage medium of claim 11, wherein the called number is included in the request, and wherein the operations further comprise comparing the called number against a first calling range associated with the first carrier network and a second calling range associated with the second carrier network.

16. The non-transitory machine-readable storage medium of claim 15, wherein the comparing of the called number against the first calling range and the second calling range is performed according to a numbering plan area (NPA), a central office code (NXX), or a combination thereof.

17. The non-transitory machine-readable storage medium of claim 11, wherein, responsive to determining that the second device is associated with the first carrier network, the operations further comprise:
  obtaining a second record associated with the called number from a first carrier network telephone number mapping (ENUM) equipment server according to the request;
  determining a second internet protocol address for the second device from the second record associated with the called number; and
  transmitting the second internet protocol address for the second device to a terminating server of the first carrier network to initiate the internet protocol call session between the first device of the first carrier network and the second device of the first carrier network.

18. A method, comprising:
  obtaining, by a processing system including a processor, a request provided by a first device of a first carrier network for an internet protocol call session with a second device;
  comparing, by the processing system, a called number included in the request against a first calling range associated with the first carrier network and a second calling range associated with a second carrier network; and
  responsive to a determination by the processing system that the second device is associated with the second carrier network:
    obtaining, by the processing system, a record associated with the called number from a second carrier network telephone number mapping (ENUM) equipment server of the second carrier network according to a pointer to the second carrier network telephone number mapping equipment server; and
    transmitting, by the processing system, an internet protocol address for the second device derived from the record to a controller of the first carrier network such that the internet protocol call session is initiated,
  wherein the pointer is obtained from an internetwork packet exchange telephone number mapping (ENUM) equipment server of a third network.

19. The method of claim 18, wherein the comparing is performed according to a numbering plan area (NPA), a central office code (NXX), or a combination thereof.

20. The method of claim 18, wherein the request comprises a session initiation protocol message.

* * * * *

UNITED STATES PATENT AND TRADEMARK OFFICE
CERTIFICATE OF CORRECTION

PATENT NO. : 11,019,217 B2  
APPLICATION NO. : 16/270638  
DATED : May 25, 2021  
INVENTOR(S) : Bernard S. Ku, Lakshminarashimhan Naidu and James W. Forsyth Page 1 of 1

It is certified that error appears in the above-identified patent and that said Letters Patent is hereby corrected as shown below:

In the Claims

Column 21, Line 36: In Claim 6: after "equipment server" delete "(ENUM)";

Column 21, Line 38: In Claim 6: delete "first";

Column 21, Line 40: In Claim 6: delete "that is received".

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*